UNITED STATES PATENT OFFICE.

JOSEPH L. TURNER, OF PHILADELPHIA, PENNSYLVANIA, AND CHARLES E. VANDERKLEED, OF COLLINGSWOOD, NEW JERSEY, ASSIGNORS TO H. K. MULFORD COMPANY, OF PHILADELPHIA, PENNSYLVANIA, A CORPORATION OF PENNSYLVANIA.

PROCESS OF PREPARING BISMUTH BETA-NAPHTHOLATE.

985,559. Specification of Letters Patent. Patented Feb. 28, 1911.

No Drawing. Application filed September 14, 1909. Serial No. 517,572.

*To all whom it may concern:*

Be it known that we, JOSEPH L. TURNER, a subject of the Czar of Russia, and CHARLES E. VANDERKLEED, a citizen of the United States, residing, respectively, in Philadelphia, Pennsylvania, and Collingswood, New Jersey, have invented certain Improvements in Processes for Preparing Bismuth Beta-Naphtholate, of which the following is a specification.

The object of our invention is to provide a process for preparing an antiseptic compound for internal use which shall consist of beta-naphthol in combination with bismuth oxid and shall not possess the objectionable taste and corrosive qualities characterizing beta-naphthol.

Another object of our invention is to produce an antiseptic containing about 75% of bismuth oxid and about 23% of beta-naphthol in true chemical combination;—the compound, moreover, being so prepared that it shall not contain any of the decomposition products of the beta-naphthol.

In carrying out our invention, we first convert the beta-naphthol into its sodium salt by dissolving it in the theoretical amount of sodium hydroxid. We then add to this solution a solution obtained by dissolving crystals of bismuth nitrate in acetic acid, then neutralize the nitric acid freed from the bismuth nitrate and also the acetic acid, by a further addition of sodium hydroxid solution. The precipitate obtained by this process is a brownish gray powder containing about 23% of beta-naphthol in combination with 75% bismuth oxid, the reactions which occur in its formation being as follows:—

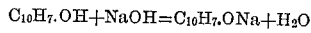
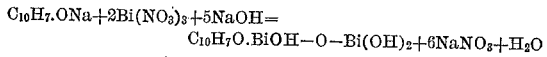

In actually carrying out the process, we employ, for example, twenty-five pounds of beta-naphthol dissovled in a solution of twenty-eight pounds of sodium hydroxid in twenty gallons of water. To this we add, first, a solution of 84 pounds of bismuth nitrate in a mixture of one hundred pounds glacial acetic acid and eleven gallons of water, and then gradually add a solution of sixty-two pounds of sodium hydroxid in ten gallons of water, the whole being then boiled for from eight to ten hours under constant stirring. The precipitate is then left to settle, the supernatant liquid is decanted and the precipitate is washed by filtration until the washings cease to show an alkaline reaction. The precipitate is finally dried at a moderate temperature.

The product resulting from the above described process is the desired compound of bismuth and beta-naphthol, which is a valuable intestinal antiseptic possessing the qualities above indicated.

As illustrating the distinctive characteristics of the product prepared by our process, if a given weight of said product be extracted with chloroform, evaporated carefully to dryness in a weighed flask and the residue weighed, it will be found that said product yields only about 0.6% of extractive. It will further be noted that the product obtained in the above determination presents a crystalline appearance, is ready sublimable, and has a melting point of about 122° C.

We claim:—

1. The process of preparing the herein described compound of bismuth and beta-naphthol which consists in converting beta-naphthol into one of its alkaline salts; acting on said compound with an acid solution of bismuth nitrate; neutralizing the resulting solution; boiling said solution; and separating therefrom the compound of bismuth and beta-naphthol.

2. The process of preparing the herein described compound of bismuth and beta-naphthol which consists in acting on beta-naphthol with a solution of sodium hydroxid; adding thereto the solution obtained by dissolving bismuth nitrate in acetic acid; neutralizing the resulting solution; boiling said solution; and separating the precipitate formed.

3. The process of preparing the herein described compound of bismuth and beta-naphthol which consists in dissolving beta-naphthol in a solution of sodium hydroxid and water; adding to said solution a second solution of bismuth nitrate and a mixture of acetic acid and water; then adding a further amount of sodium hydroxid; boiling the combined solutions; and separating the precipitate formed.

4. The process of preparing the herein described compound of bismuth and beta-naphthol which consists in dissolving 25 pounds of beta-naphthol in a solution of 28 pounds of sodium hydroxid in 20 gallons of water; adding to the same, first a solution of 84 pounds of bismuth nitrate and 100 pounds of glacial acetic acid in 11 gallons of water, and then a solution of 62 pounds of sodium hydroxid in 10 gallons of water; boiling the solutions and separating out the resulting precipitate; the proportions of the ingredients being substantially as specified.

In testimony whereof, we have signed our names to this specification, in the presence of two subscribing witnesses.

JOSEPH L. TURNER.
CHARLES E. VANDERKLEED.

Witnesses:
WILLIAM E. BRADLEY,
WM. A. BARR.